United States Patent [19]
Eustache et al.

[11] Patent Number: 5,561,882
[45] Date of Patent: Oct. 8, 1996

[54] WASHING AND WIPING APPARATUS FOR A VEHICLE WINDSHIELD

[75] Inventors: Jean-Pierre Eustache, Antony; Gilles Berge, Clairefontaine en Yvelines, both of France

[73] Assignee: Valeo Systemes d'Essuyage, Montigny-le-Bretonneux, France

[21] Appl. No.: 122,715

[22] Filed: Sep. 15, 1993

[30] Foreign Application Priority Data

Sep. 15, 1992 [FR] France .................................. 92 10970

[51] Int. Cl.$^6$ .............................. B60S 1/04; B60S 1/50
[52] U.S. Cl. .................. 15/250.001; 15/250.04; 15/250.30; 239/284.1; 296/192; 296/901
[58] Field of Search ............................ 15/250.01, 250.02, 15/250.03, 250.04, 250.001, 250.30; 239/284.1; 296/192, 901, 194

[56] References Cited

U.S. PATENT DOCUMENTS

| | | | |
|---|---|---|---|
| 3,793,671 | 2/1974 | Gebhard | 15/250.01 |
| 3,887,956 | 6/1975 | Wind | 15/250.04 |
| 4,339,698 | 7/1982 | Kearns | 15/250.12 |
| 4,585,980 | 4/1986 | Gille et al. | 318/444 |
| 4,893,865 | 1/1990 | McClain et al. | 296/192 |
| 5,108,146 | 4/1992 | Sheppard | 296/192 |
| 5,203,602 | 4/1993 | Eustache | 296/192 |
| 5,271,120 | 12/1993 | Eustache e tal. | 15/250.01 |

FOREIGN PATENT DOCUMENTS

| | | |
|---|---|---|
| 0354646 | 2/1990 | European Pat. Off. . |
| 489630 | 6/1992 | European Pat. Off. ............ 15/250.01 |
| 2538327 | 6/1984 | France . |
| 2613303 | 10/1988 | France ............................. 15/250.03 |
| 0321330 | 6/1989 | France . |
| 2668110 | 4/1992 | France . |
| 04050060 | 2/1992 | Japan . |

Primary Examiner—Gary K. Graham
Attorney, Agent, or Firm—Morgan & Finnegan, L.L.P.

[57] ABSTRACT

A modular apparatus, for washing and wiping a windshield of a vehicle which has a hood extending downwardly away from the lower edge of the windshield, comprises at least two modules to be assembled together and to the rest of the vehicle. One of the modules is arranged to contain a screen washing liquid, and defines a reservoir for the latter, while the other module includes a windshield wiper.

6 Claims, 6 Drawing Sheets

WASHING AND WIPING APPARATUS FOR A VEHICLE WINDSHIELD

FIELD OF THE INVENTION

The present invention relates to an apparatus for washing and wiping a windshield of a vehicle, especially a motor vehicle, of the kind having a hood situated below the lower edge of the windshield.

BACKGROUND OF THE INVENTION

The space lying between the hood and the lower edge of the windshield commonly serves as a location for mounting the windshield wiping apparatus on the vehicle, and also for locating an air inlet for admitting air from outside the vehicle to the interior of the latter, this inlet having an air inlet grille. A motor vehicle also, usually, has means for washing the windshield, comprising a windshield washing liquid reservoir together with means for spraying this liquid on to the windshield. The windshield washing liquid reservoir is commonly arranged under the hood, in the front compartment of the vehicle. The mounting on the vehicle of the wiping means, air inlet means, air inlet grille, reservoir, and washing liquid spray means are operations which occupy a substantial amount of working time because they are difficult to carry out by means of automated assembly equipment. In consequence, these operations in the assembly of a motor vehicle are expensive.

It has already been proposed to integrate into the wiping and washing apparatus, in a monobloc manner, the air inlet grille, air admission duct, washing liquid reservoir, wiping means, and the washing liquid spray means, in such a way as to simplify the assembly operation of the vehicle and to enable it to be carried out using automated equipment.

However, the monobloc wiping and washing apparatuses proposed up till now are related specifically to a given model of vehicle, with the disadvantage of increased manufacturing costs.

DISCUSSION OF THE INVENTION

An object of the present invention is to provide a modular apparatus for wiping and washing a vehicle windshield, in which the above mentioned drawback, in particular, is mitigated; that is to say an apparatus of this kind which includes at least one common module that may be used in different types or models of vehicle, thus reducing manufacturing costs and benefiting from economies of scale.

More particularly, in accordance with a first feature of the invention, the modular apparatus is characterised in that it comprises at least two modules to be assembled together and to the remainder of the vehicle, with one of the two modules being adapted to contain a screen washing liquid by defining a reservoir for the latter, while the other module carries the wiping means for the windshield.

According to another feature of the invention, the reservoir module includes a duct for guiding the air from outside the vehicle to the interior of the latter, this duct being provided at its inlet with an air inlet grille.

More particularly, in one type of embodiment of the invention, the reservoir module comprises two elongated hollow portions defining cavities for containing the said liquid, these elongated hollow portions being respectively adjacent to the hood and to the windshield and extending side by side but in spaced apart relationship from each other, and further including two lateral portions joining together the ends of the said elongated hollow portions, whereby to bring the said cavities into communication with each other so as to form a single reservoir. The reservoir module further includes an exposed upper face which is generally flat, and which defines an extension of the outer surface of the hood, extending longitudinally over at least part of the width of the vehicle and laterally between the hood and the windshield; the walls of the two elongated portions which are in facing relationship to each other, together with their lateral walls, define the said duct, which is oriented generally at right angles to the plane of the said upper face and is open through this latter face.

According to a preferred feature of the invention, the reservoir module is provided on its longitudinal side adjacent to the hood with an upwardly curved tongue defining a channel and having a free edge lying under the hood. Preferably, this tongue is provided on its free edge with a sealing gasket which is engaged against the internal surface of the hood.

In one type of embodiment of the invention, the modular apparatus comprises two screen wiping modules lying on either side of the reservoir module and defining extensions of the latter, with each of the screen wiping modules carrying a screen wiper arm which is secured to a drive spindle for rotation with the latter, together with drive means for driving the spindle in rotation.

Further features and advantages of the present invention will appear more clearly on a reading of the detailed description of preferred embodiments of the invention given below. This description is given by way of non-limiting example only and with reference to the accompanying drawings.

DESCRIPTION OF PREFERRED EMBODIMENTS OF THE INVENTION

Figure 1:
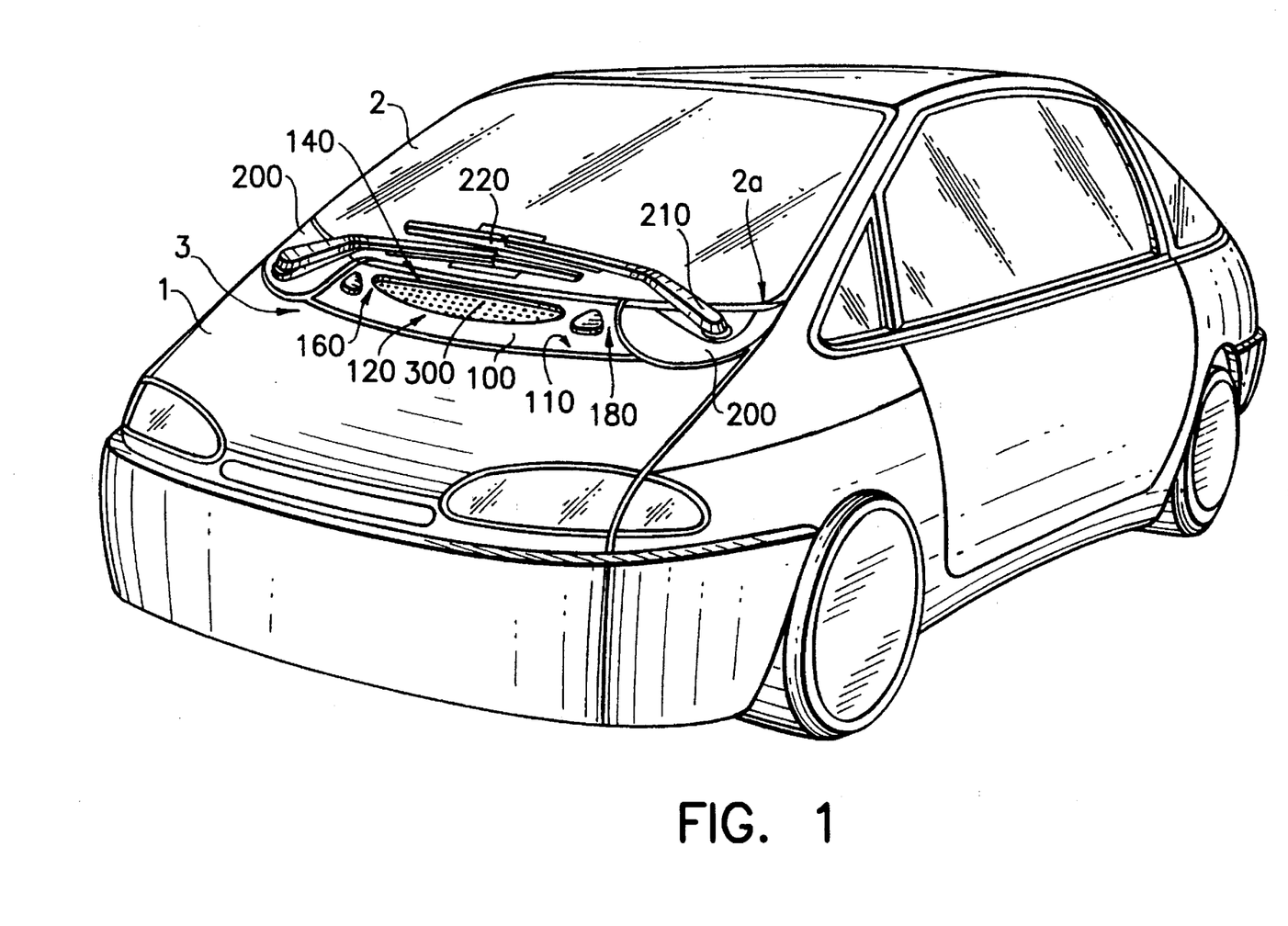
FIG. 1 is a diagrammatic perspective view of a vehicle equipped with a modular windshield washing and wiping apparatus in accordance with the present invention.

FIG. 1 shows, in perspective and in a simplified form, a general view of a motor vehicle having a hood 1 which extends away from the lower edge 2a of the windshield 2. The vehicle is equipped with a modular apparatus 3 for washing and wiping the windshield 2 of the vehicle. In the embodiment shown in FIGS. 1 to 6, the modular apparatus 3 comprises a module 100 defining a reservoir (referred to in this description as the reservoir module), together with two screen wiping modules 200.

The reservoir module 100 has an exposed upper face 100 which is generally flat, and which constitutes an extension of the outer surface of the hood 1, extending longitudinally over part of the width of the vehicle on either side of a longitudinal plane of symmetry of the body of the vehicle, and laterally between the hood 1 and the lower edge 2a of the windshield 2. Each screen wiping module again has an exposed upper surface which constitutes generally an extension of the outer surface of the hood 1. The screen wiping modules 200 are arranged on either side of the reservoir module 100, and constitue extensions of the latter towards the sides of the vehicle, so as to cover the space lying between the hood 1 and the lower edge 2a of the windshield 2.

Each screen wiping module 200 carries a screen wiper arm 200 of any suitable known type, the wiper arm 200 having at one end fastening means for securing it on a drive spindle 212, which is coupled with drive means for driving the spindle 212 in rotation. The other or free end of each screen wiper arm 210 carries a wiper blade 220, which includes a wiping strip in the usual way for sweeping over the windshield 2.

The reservoir module 100 has two elongated hollow portions 120 and 140 defining cavities 121 and 141 respectively, for containing a screen washing liquid. These elongated hollow portions 120 and 141 lie adjacent to the hood 1 and the lower edge 2a of the windshield 2 respectively, and extend side by side while being spaced apart from each other. The ends of the elongated hollow portions 120 and 140 are joined by two lateral portions 160 and 180 of the module 100, in such a way as to bring the two cavities 121 and 141 into communication with each other. The walls of the two portions 120 and 140 that lie facing each other, together with the lateral portions 160 and 180, together define an air duct 190 which is oriented generally at right angles to the plane of the upper face 110 of the module 100. This duct 190 is open through the upper face 110 so as to act as a guide for air drawn from outside the vehicle into the latter.

Figure 2:
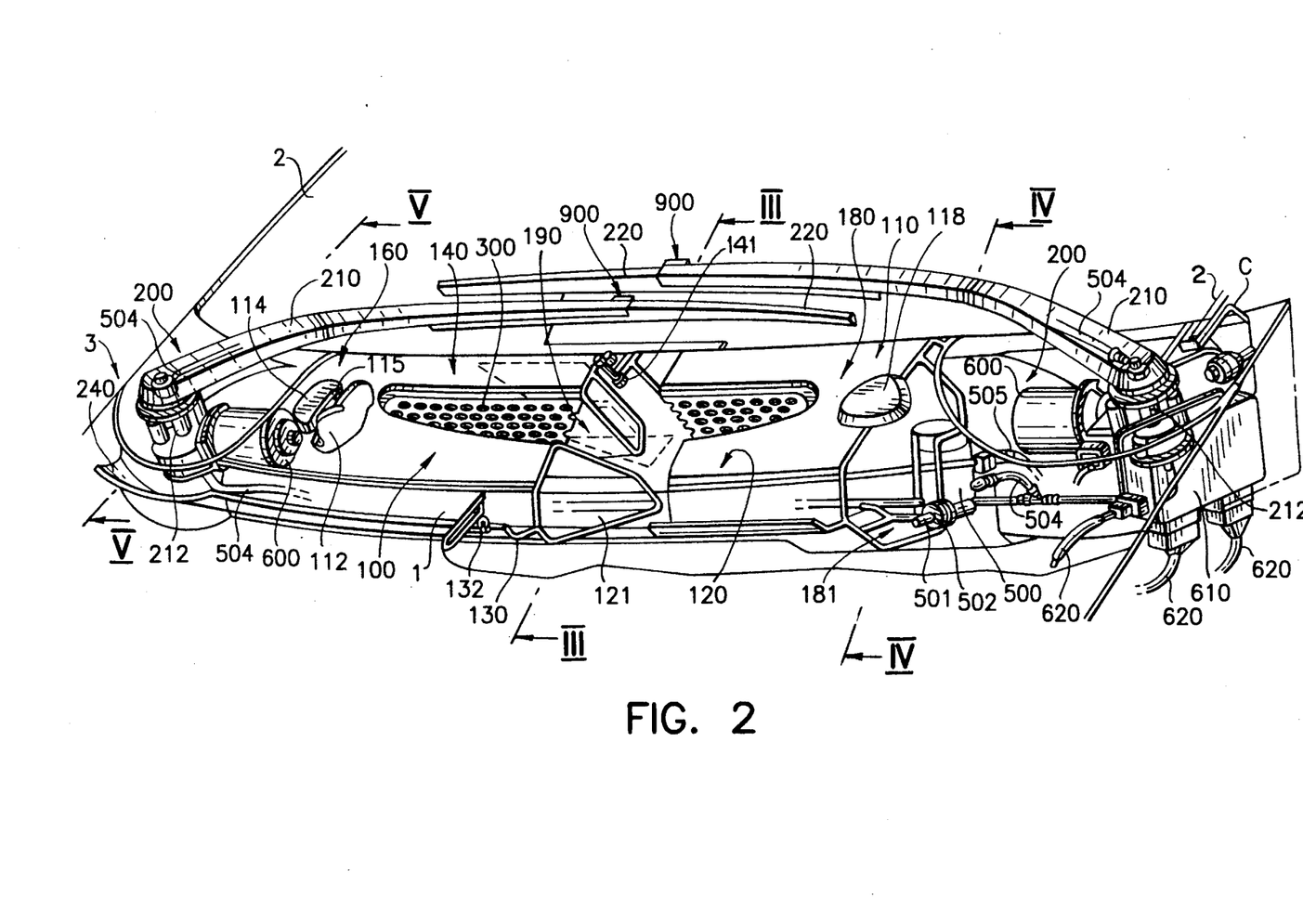
FIG. 2 is a diagrammatic perspective view, shown partly cut away, of a modular apparatus for washing and wiping the windshield in accordance with the present invention.

Preferably, and as shown in FIGS. 1 and 2 in particular, an air inlet grille 300 is located at the inlet end of the air duct 190, this grille being recessed slightly below the upper face 110 of the module. The grille 300 may be either a separate component attached to the remainder of the module, or it may be integral with the rest of the module 100 so that the latter is in the form of a monobloc unit.

Figure 3:
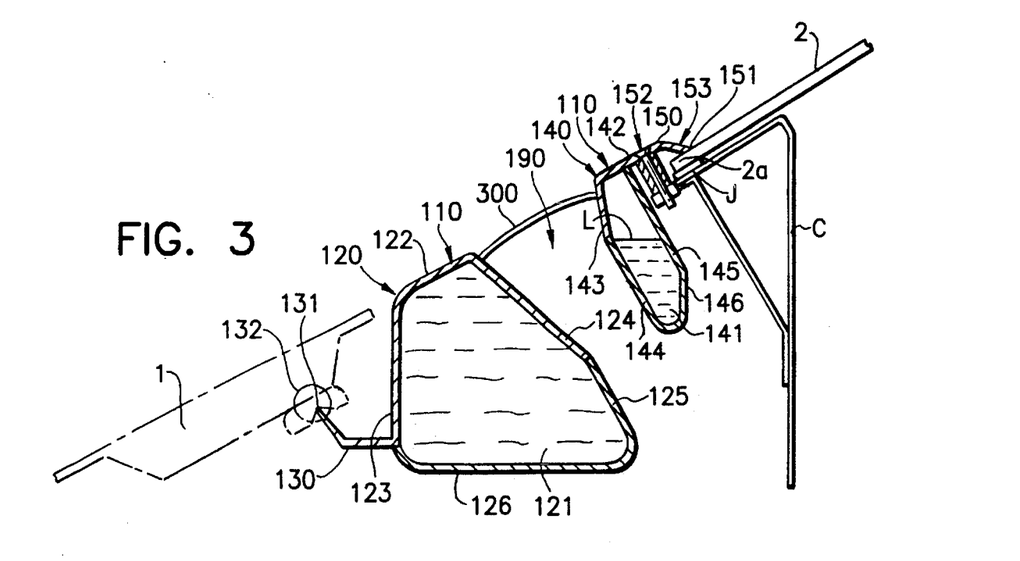
FIG. 3 is a simplified cross sectional view as seen generally on the line III—III in FIG. 2.

Reference is now made more particularly to FIG. 3, which is a view in cross section taken on the transverse central plane of the reservoir module 100. It will be noted from FIG. 3 that the elongated hollow portion 120 adjacent to the hood 1 has a transverse cross section, the width of which increases towards the bottom. More precisely, the elongated hollow portion 120 adjacent to the hood 1 is delimited by a wall having a transverse cross section in the form of a generally outwardly convex profile defined by five segments joined through rounded portions. FIG. 3 shows an upper segment 122 which is contained in the same plane as the upper face 110, and which is extended downwardly at its end close to the hood 1 by a vertical segment 123, while at its end remote from the hood 1, the upper segment 122 is extended by an inclined segment 124 which is directed downwardly away from the vertical side 123. The segment 124 is extended, about level with the mid-height of the vertical side 123, by a second inclined segment 125 which is steeper than the segment 124. A horizontal segment 126 joins the vertical segment 123 and the segment 125 together, and defines the base of the cavity 121.

The other elongated hollow portion 140, adjacent to the windshield 2 and defining the cavity 141, is delimited by a wall having a transverse cross section with a profile which is generally convex outwardly, and which is defined by five segments joined together through rounded portions. More precisely, FIG. 3 shows an upper segment 142 lying in the plane of the upper face 110 of the module and in alignment with the upper segment 122 of the hollow portion 120. The upper segment 142 is extended at its end nearest to the duct 190 by a downwardly extending inclined segment 143, which is slightly inclined with respect to the vertical plane containing the vertical side segment 123 of the hollow portion 120, the inclined segment 143 being spaced away from the latter. A less steep inclined segment 144, again oblique (or inclined) but of less steep angle of inclination than the segment 143, extends the segment 143 downwardly from approximately the same level as the upper end of the upper segment 122 of the hollow portion 120. This second inclined segment 144 extends down to approximately the same level as the junction between the first inclined segment 124 and second inclined segment 125 of the hollow portion 120. The upper segment 142 is extended, at right angles to it and downwardly, at that one of its ends which is remote from the duct 190, by a third inclined segment 145 which is parallel to the segment 144, and which extends down to approximately the midheight of the latter. The segment 125 is extended by a vertical segment 146, which is joined at the bottom to the second inclined segment 144 through a rounded wall portion at approximately the same level, mentioned above, as the junction between the segments 124 and 125. The walls of the elongated hollow portions 120 and 140 facing each other, that is to say, considered in transverse cross section the segments 124, 125 and 143, 144, define the air duct 190, which is generally convergent from the exposed upper surface 110 towards the interior of the vehicle.

In this example, the reservoir module 100 has an upwardly curved tongue 130 extending longitudinally along its side adjacent to the hood 1. The free edge 131 of the tongue 130 lies below the hood 1. More precisely, the tongue 130 is joined to the lower portion of this longitudinal side, and more particularly in the same plane as the transverse cross section of FIG. 3, at right angles to the lower end of the vertical segment 123. Preferably, and as shown in FIG. 13, the tongue 130 is provided with a sealing gasket 132 having an initial circular transverse cross section and extending along the longitudinal free edge 131 of the tongue 130. The gasket 132 is engaged against the internal surface of the hood 1, and assumes a shape such as is indicated in FIG. 3 in phantom lines.

In this example the reservoir module 100 also has, on its longitudinal side adjacent to the windshield of the vehicle, another tongue 150 which has a transverse cross section defining a downwardly curved profile. The free edge 151 of the latter bears on the outer surface of the windshield 2. More precisely, the tongue 150 has, in transverse cross section, a first portion 152 which is generally flat and which defines an extension of the exposed upper face 110 of the module, this portion 152 being extended by a generally flat and downwardly inclined second portion 153 of the tongue, the free edge 151 being defined on this second portion 153. The first portion 152 serves for fastening of the reservoir module 100 to a fixed bulkhead C of the vehicle. This may be effected by any appropriate known fastening means: as shown here, by way of example, the tongue portion 152 is screwed to the bulkhead C. Examination of FIG. 3 will reveal the presence of a seal J, which is interposed between the edge 2a of the windshield 2 and the bulkhead C of the vehicle.

The elongated hollow portions 120 and 140 have transverse cross sections which become wider with increasing distance from the transverse central plane which corresponds to the plane on which the cross section of FIG. 3 is taken, up to a point at which they join so as to define the lateral portions 160 and 180. The cavities 121 and 141 are thereby brought into communication with each other, so as to define together a single, generally D-shaped, reservoir. The bases of the lateral portions 160 and 180 are generally flat and lie beyond the base of the cavity 141 defined by the elongated hollow portion 140. It should be noted that in the drawings, only the base 181 (see FIG. 4) of the lateral portion 180 can be seen.

Figure 4:
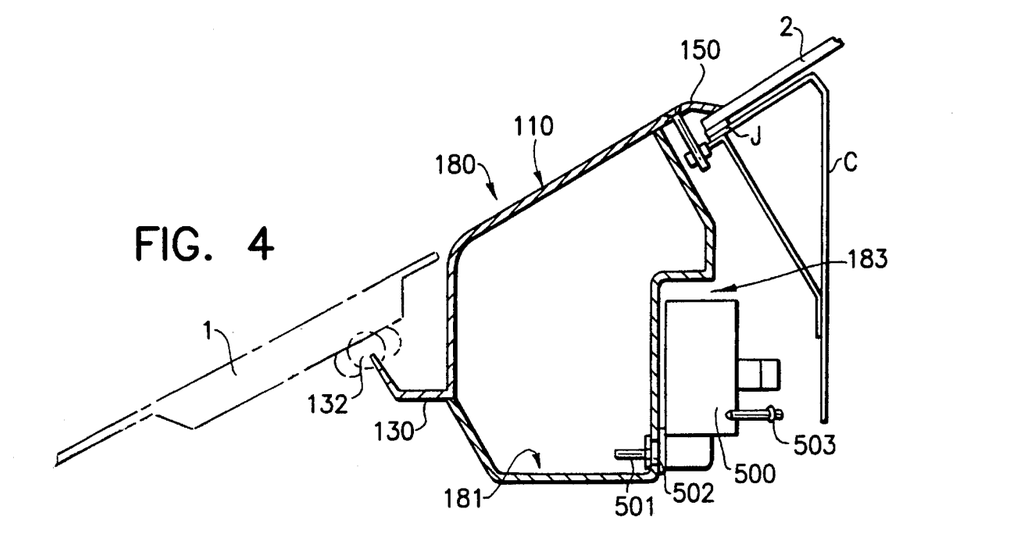
FIG. 4 is a similar view but with the cross section taken on the line IV—IV in FIG. 2.

Preferably, and as shown, the reservoir module 100 includes a pump 500 for drawing windshield washing liquid from the reservoir for spraying it on to the windshield. More particularly, the pump 500 is mounted in a recess 183 which is formed in the wall of the lateral portion 180. The pump 500 includes a suction nozzle 501, extending through the wall of the lateral portion 180 at a point which is preferably situated (as shown in FIG. 4) close to the base 181 of the portion 180. The nozzle 501 is sealed to the wall through which it passes by a suitable sealing gasket 502. The pump 500 also has an outlet nozzle 503 which, as is best seen in FIG. 2, is connected to pipes 504 which convey the windshield washing liquid L drawn through the suction nozzle 501 towards spray jets for the windshield. In the embodiment shown in FIGS. 1 to 6, these jets are incorporated in the windshield wiper arms 210. The pump 500 is supplied with electrical energy through an electrical supply cable 500 which is shown in part in FIG. 2. The jet nozzles incorporated in the wiper arm 210 are not shown: the supply of washing fluid to these nozzles is preferably made (as will be described in more detail below with reference to FIG. 6) through a duct 506 passing through the drive spindle 212 and along the axis of the latter.

In this example, the reservoir module 100 has a filling orifice 112 formed on its exposed upper face 110. The filling orifice 112 is directly accessible from outside the vehicle, and is provided with suitable closure means. More particularly, a wall 115 is defined on the contour of the orifice 112 and projects from the exposed outer surface 110. The free edge of the wall 115 carries a collar or bead on which a closure cap 114 for the orifice 112 is snap-fitted. In FIG. 2, the closure cap 114 is shown partly cut away. The wall 115 is extended into the interior of the reservoir module 100 over a length which is substantially equal to the length of this wall that projects outwardly from the exposed outer surface 110, so as to provide sufficient mechanical strength against mechanical forces which are applied during fitting and removal of the closure cap 114. Preferably, and as can be seen in FIG. 2, the lateral portion 180 of the module supports a further cap 118 which is similar to the cap 114, the cap 118 being a dummy for giving the module 110 an external appearance which is symmetrical about the transverse central plane III—III (FIG. 2). The cap 118 may be secured either by fastening means similar to those described above with respect to the closure cap 114, or any other appropriate fastening means.

Figure 5:
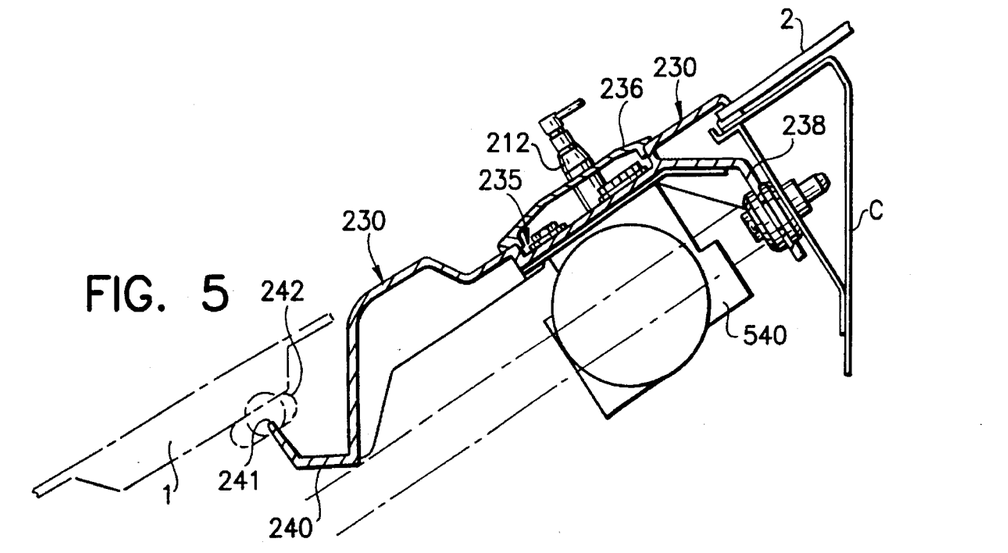
FIG. 5 is again a view similar to FIGS. 3 and 4, but is taken on the line V—V in FIG. 2.

Reference is now made to FIG. 5, which shows in cross section, in simplified form, part of one of the screen wiping modules 200. It will be noted from FIG. 5 that this module 200 has an exposed upper surface 230 which is generally flat, and which defines an extension of the outer surface of the hood 1 and windshield 2. More particularly, the surface 230 has a contour which is delimited firstly by the lower edge 2a of the windshield, and secondly by a curved line which defines a concavity oriented towards the lower edge of the windshield so as to substantially follow the contour of the free edge adjacent to the hood 1. Each screen wiping module 200 has on its side adjacent to the hood 1 a tongue 240 which is curved upwardly, and which defines a channel. The free edge 241 of the tongue 240 carries a sealing gasket 242 which is engaged against the inner surface of the hood 1. The gasket 242 has a circular cross section in its initial, undeformed, state; and on being applied against the inner surface of the hood 1 it assumes a generally flat cross section as indicated in FIG. 5 in phantom lines.

The reservoir module 100 is assembled with a screen wiping module 200 in such a way that the tongue 130 (FIG. 3) of the former at least partly overlies the tongue 240 of the latter, in such a way that any water collected in the channel formed by the tongue 130 (for example in wet weather or when the vehicle is being washed) will flow into the tongue 240 and along the latter to its free end, from which it can escape by gravity.

The drive means for the windshield wiper arms 210 are of any suitable known kind, and a typical form of these drive means will now be briefly described with reference to FIGS. 2, 5 and 6. Preferably, and as shown in those Figures, each of the two arms 210 is driven in rotation by a motor 600. The rotational movement of the motor 600 is synchronised by electrical control means, which in this example consist of electronic devices 610 of any suitable known kind. These electrical control means may also have other functions which are linked to the operation of wiping and/or the washing function; for example, to control of the washer pump, monitoring of the liquid level in the washer fluid reservoir, and so on. In the embodiment shown in FIG. 2, the electronic control means 610 are carried by one of the screen wiping modules 200, and are connected to an electrical supply source and to control means located in the cabin of the vehicle. They are also connected to the motors 600 through electric cables 620.

Figure 6:
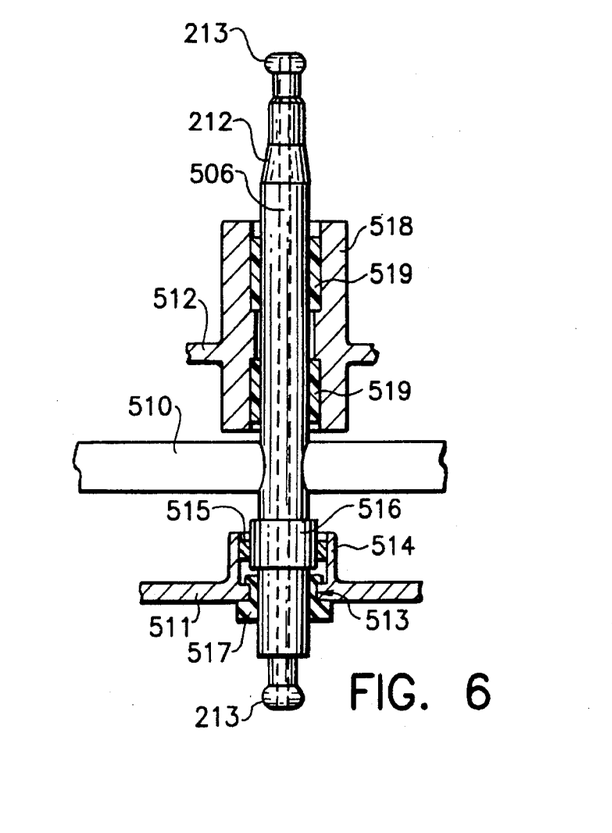
FIG. 6 is a view in longitudinal cross section of a drive spindle in one embodiment of apparatus in accordance with the invention.

Each of the motors 600 drives a respective drive spindle 212 in rotation, through gear means 510 which are indicated partially in FIG. 6 and which are mounted within a housing 540 (FIG. 5), which is delimited at the bottom and at the top by walls 511 and 512 respectively. The walls 511 and 512 are only partially shown. They each have a passage through which the drive spindle 212 passes. More particularly, the lower wall 511 has a hole 513, through which the lower part of the drive spindle 212 extends out of the housing 540 which contains the gear means 510, for connection of the spindle 212 to a feed pipe for delivering windshield washing liquid to the windshield wiper arm. The hole 513 is bounded radially by a generally cylindrical skirt portion 514, which is joined to the inner surface of the wall 511 and which contains a bearing 515 cooperating with a journal 516 coaxial with the drive spindle 212. A sealing gasket 517 is engaged between the wall 511 and that portion of the drive spindle 212 which extends between the journal 516 and the lower end of the spindle. The upper wall 512 of the housing 540 is formed with a sleeve 518 where the drive spindle passes through this wall. Two bearings 519 for the drive spindle 212 are accommodated in this sleeve 518.

The axial ends of the drive spindle 212 are formed with external annular beads 213 for retaining the windshield washer liquid feed tubes by friction, and the two ends of the spindle are in communication with each other through the internal duct 506 already mentioned. The motors 600 and the housing 540 containing the gear means 510 are bolted on the underside of a bracket portion 235 formed in the upper wall of each respective screen wiper module 200. A cover 236 overlies the bracket portion 235, and is formed with a hole through which the drive spindle 212 passes, as can be seen in FIG. 5.

Each screen wiper module 200 has, on its side adjacent to the windshield, a fastening tongue 238 which springs from one edge of the bracket portion 235, and which has a terminal portion extending parallel to the bulkhead C of the vehicle, so that the screen wiping modules 200 can be secured to the latter by any suitable means, for example by means of bolts, rivets or the like.

Figure 7:
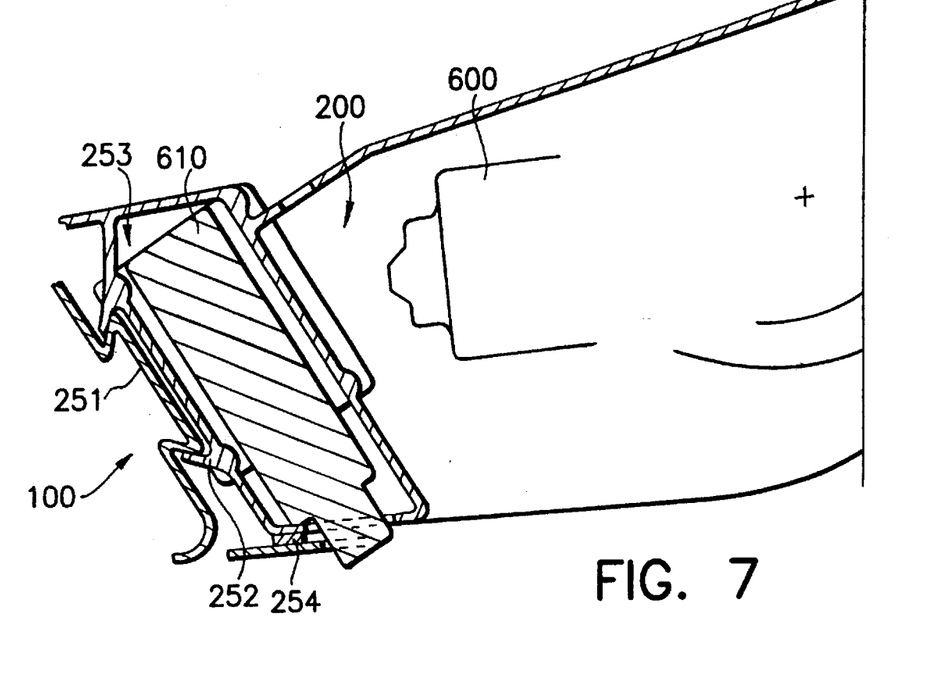
FIG. 7 is a simplified view in cross section, showing part of one embodiment of an assembly means for assembling together the reservoir module and a screen wiping module.

The assembly between the reservoir module 100 and either one of the screen wiper modules 200 can be carried out in numerous ways. Preferably however, and as illustrated in FIG. 7 to which reference is now made, this assembly is achieved with the use of assembly means comprising a tenon 251 formed on the lateral face of the screen wiping module adjacent to the reservoir module 100, and cooperating with a mortice 252 formed on the lateral face of the reservoir module in facing relationship therewith, so as to constitute a slideway of dovetail shape which is oriented generally parallel to the plane of the upper face 110 of the reservoir module, and transversely to the longitudinal direction of the latter. As can be seen from examination of FIG. 7, the electronic control means 610 for the motor 600 may be situated, in a modification, no longer on the outer side of a screen wiping module 200 as shown in FIG. 2, but in a housing 253 which is defined between the reservoir module 100 and a screen wiping module 200.

Figure 8:
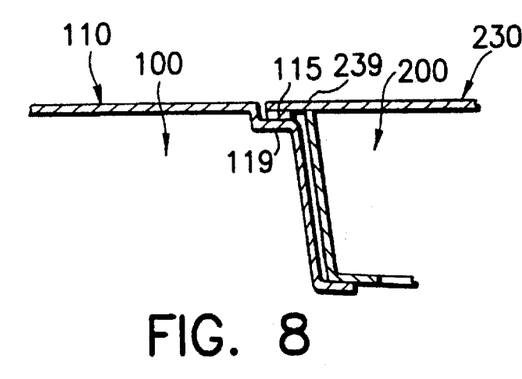
FIG. 8 is a view showing one detail of the assembly between the reservoir module and a screen wiping module.

Preferably, and again as shown in FIG. 7, the adjacent walls of the reservoir module 100 and a screen wiping module 200, respectively, overlap each other at the bottom in such a way that a sealing gasket 254 can be fitted between their facing surfaces. Preferably again, and as shown in FIG. 8 to which reference is now made, the adjacent walls of the reservoir module 100 and a screen wiping module 200 overlap at the top in such a way that another sealing gasket 215 can be fitted between their mutually facing surfaces. More particularly, the reservoir module 100 has on its edge adjacent to a screen wiping module 200 a side region 119, which lies below the plane of the exposed outer surface 110 of the reservoir module, while each screen wiping module 200 has a tongue 239 which lies in the plane of the other face 230 of that module and overlies the side region 119.

Figures 9, 10:
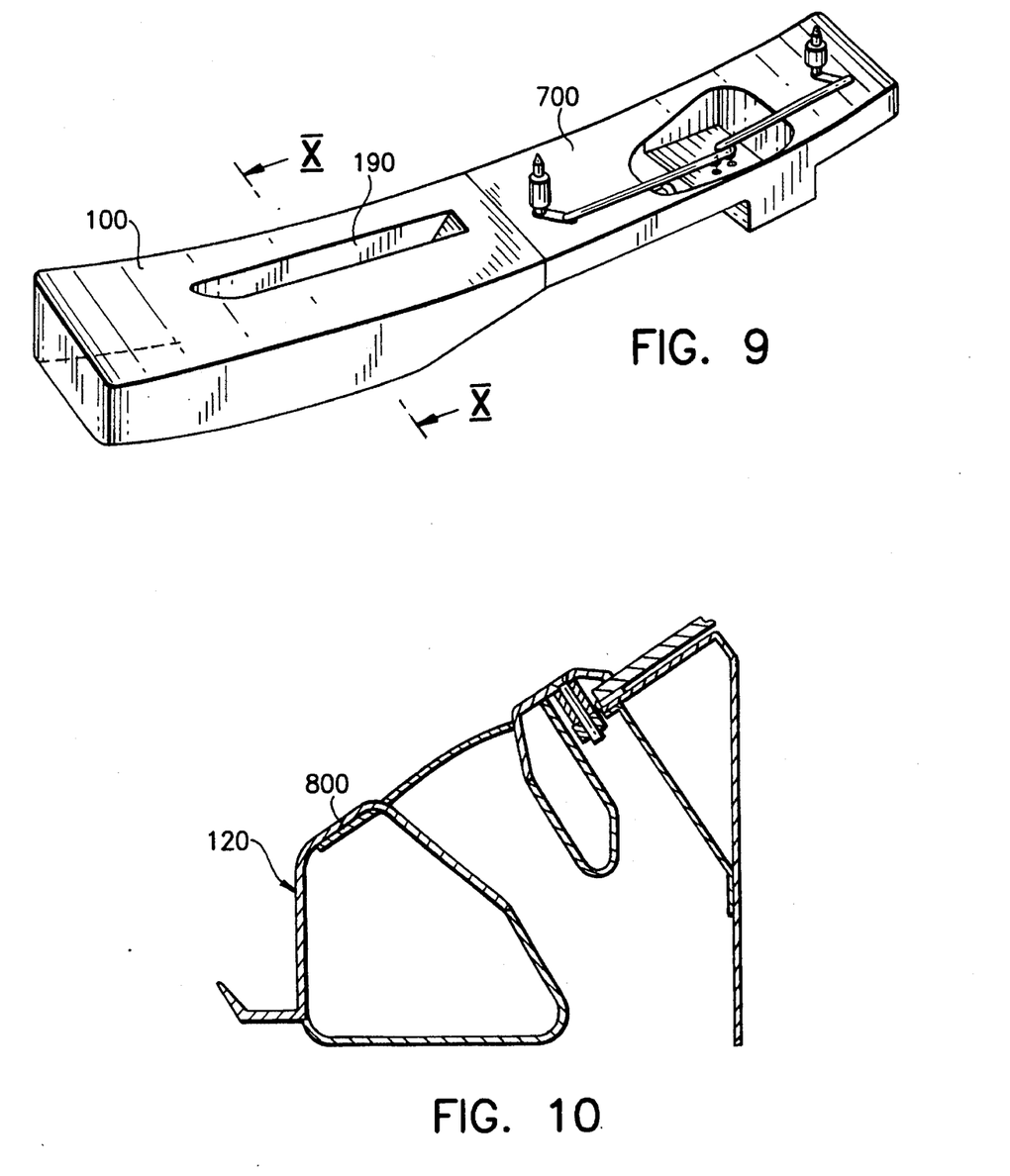
FIG. 9 is a simplified perspective view showing part of the modular apparatus in accordance with the invention, in a modified embodiment.
FIG. 10 is a simplified view in transverse cross section, taken on the line X—X in FIG. 9.

Because of its modular nature, it is possible with apparatus in accordance with the present invention, and as is illustrated in FIG. 9 to which reference is now made, to assemble the reservoir module 100 with a screen wiping module 700 having two windshield wiper arms coupled together mechanically in any suitable known way, by means of a linkage of the crank and connecting rod type driven by a single drive motor. The elongated hollow portions and the lateral portions of the reservoir module are preferably made by assembling together two shells of plastics material, one of which defines the exposed upper surface 110.

The components of the reservoir module made of plastics material can be stiffened by the use of a metallic armature extending over the length of the reservoir module. This metallic armature may, as shown in FIG. 10 to which reference is now made, comprise a metallic insert 800 lying against the underside of the upper wall of the elongated hollow body 120 and integrated into the plastics material by moulding over it.

It is also possible to provide an alternative arrangement in which the reservoir module is stiffened by means of a metallic plate over which the plastics material is moulded. This plate substantially follows the shape of the upper surface 110, and is perforated internally so as to form the air inlet grille 300 in line with the duct 190. In FIG. 12, by way of example, two jet nozzles 900 are provided on the upper wall of the reservoir module so as to direct washing liquid on to the windshield 2.

The present invention is not limited to the examples described above, and may embrace any other modifications. In particular, it can be arranged that at least one of the modules includes at least one member which is linked to the operation of the vehicle, for example a switch which controls the lighting of the engine compartment, the hinge points of the engine hood, or the opening and closing system for the hood.

What is claimed is:

1. A modular apparatus for washing and wiping a windshield of a vehicle which includes said windshield, defining a lower edge thereof, an interior region and a hood having an outer surface and extending downwardly away from said lower edge, wherein the apparatus comprises at least two modules, including an elongated reservoir module defining a reservoir for containing a windshield washing liquid, and a screen wiper module comprising a windshield wiper, the apparatus further including assembly means for assembling said modules together and to the vehicle, wherein the reservoir module defines a duct for guiding air from outside into the interior region of the vehicle, and an air inlet grille disposed at an inlet end of said duct, said grille forming a single unit with the reservoir module, wherein the reservoir module comprises two elongated hollow portions defining respective internal cavities for containing said washing liquid, one said hollow portion being adjacent to the hood and the other being adjacent to the windshield when the apparatus is assembled to the vehicle, the two hollow portions being disposed side by side but in spaced-apart relationship, the reservoir module further including two lateral portions joining the ends of said elongated hollow portions and bringing said cavities into fluid communication with each other, the reservoir module further defining an exposed upper face which is generally flat and which defines an extension of the outer surface of the hood when the apparatus is assembled to the vehicle, to extend, longitudinally of said upper face, over at least a part of the width of the vehicle and laterally of said upper face between the hood and the lower edge of the windshield, the two elongated hollow portions having walls facing each other, together with lateral walls, said facing walls and lateral walls defining said duct so that the latter is oriented generally at right angles to a plane of said upper face and is open through said upper face.

2. Apparatus according to claim 1, wherein the reservoir module is provided with a tongue on a longitudinal side thereof, said tongue being upwardly curved so as to define a channel, and having a free edge lying below the hood when the apparatus is assembled to the vehicle.

3. Apparatus according to claim 2, wherein said tongue has a sealing gasket on its free edge for engagement against an internal surface of the hood.

4. Apparatus according to claim 1, wherein the reservoir module defines a filling orifice for windshield washing fluid, in the exposed upper face of the module, together with a closure cap for closing said orifice and mounting means mounting said cap on said upper face.

5. Apparatus according to claim 4, wherein the reservoir module defines a transverse central plane thereof and one of said lateral portions defines said filling orifice, the reservoir module further including another cap similar to said closure cap, with the other lateral portion of the module having means mounting said other cap so as to give the module a symmetrical external appearance about the transverse central plane of the reservoir module.

6. Apparatus according to claim 1, wherein the reservoir module further has a tongue on a longitudinal edge thereof, said tongue having in transverse cross section a downwardly curved profile defining a free edge, which is engaged on the windshield when the apparatus is assembled to the vehicle.

* * * * *